United States Patent
Muskatblit et al.

(10) Patent No.: US 12,007,915 B1
(45) Date of Patent: Jun. 11, 2024

(54) FIELD PROGRAMMABLE GATE ARRAY-BASED LOW LATENCY DISAGGREGATED SYSTEM ORCHESTRATOR

(71) Applicant: Morgan Stanley Services Group Inc., New York, NY (US)

(72) Inventors: Igor G. Muskatblit, Mountain View, CA (US); Michael Gorbovitski, New York, NY (US); Joshua N. Elijah, London (GB)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 18/447,707

(22) Filed: Aug. 10, 2023

(51) Int. Cl.
    *G06F 13/16* (2006.01)
(52) U.S. Cl.
    CPC ...... *G06F 13/1668* (2013.01); *G06F 2213/16* (2013.01); *G06F 2213/40* (2013.01)
(58) Field of Classification Search
    None
    See application file for complete search history.

(56) References Cited

U.S. PATENT DOCUMENTS

| | | | |
|---|---|---|---|
| 8,138,788 B2* | 3/2012 | Honda | H03K 19/17752 326/38 |
| 8,463,934 B2 | 6/2013 | Maitra | |
| 9,509,604 B1* | 11/2016 | Livesey | H04L 45/44 |
| 9,811,281 B2 | 11/2017 | Bivens et al. | |
| 10,448,126 B2 | 10/2019 | Gilsdorf et al. | |
| 10,735,378 B1* | 8/2020 | Bosco | H04L 63/0245 |
| 10,789,090 B2 | 9/2020 | Koh et al. | |
| 2003/0005155 A1* | 1/2003 | Carbonell | G06F 15/173 709/239 |
| 2013/0159452 A1* | 6/2013 | Saldana De Fuentes | G06F 15/167 709/213 |
| 2021/0117360 A1* | 4/2021 | Kutch | G06F 13/4027 |
| 2021/0194821 A1 | 6/2021 | Guim Bernat et al. | |
| 2021/0390056 A1 | 12/2021 | Koh et al. | |
| 2021/0397943 A1* | 12/2021 | Ribalta | G06N 3/08 |
| 2022/0100582 A1* | 3/2022 | Lal | G06F 9/3814 |

FOREIGN PATENT DOCUMENTS

KR 102441992 B1 9/2022

* cited by examiner

*Primary Examiner* — Michael Sun
(74) *Attorney, Agent, or Firm* — Leason Ellis LLP

(57) ABSTRACT

An asynchronous computer-implemented disaggregated processing system including an ethernet transceiver configured to receive data, from a computing device over a data communications network. A core processor is configured to execute to process information associated with at least some of the received data and a memory is configured to store, via a memory controller, processed information from the core processor. A field programmable gate array is configured via an execution implementation directive to parse at least some of the received data; preprocess at least some of the parsed data for use by the core processor; route, to the core processor, the preprocessed data; receive, from the core processor, information associated with the preprocessed data; route, to the computing device, a response associated with the information associated with the preprocessed data received from the core processor; and store, via the memory controller, the information associated with the preprocessed data in the memory.

24 Claims, 7 Drawing Sheets

FIELD PROGRAMMABLE GATE ARRAY-BASED LOW LATENCY DISAGGREGATED SYSTEM ORCHESTRATOR

FIELD

The present disclosure relates, generally, to data communication networking and, more particularly, to a system and method for providing low latency in multiple interconnected systems.

BACKGROUND

New data center applications often use a variety of different and complementary data processing subsystems to achieve a specific purpose. For example, combinations of central processing units ("CPUs"), artificial intelligence ("AI") processors, memory, and network interfaces are often aggregated in a server computing device for performing operations relating to one or more specific data center applications.

In some cases, a server computing device relies on a central CPU that is interconnected to a variety of component devices, such as AI accelerators, network cards, and memory, to orchestrate operations. This interconnection can be achieved by peripheral component interconnect express ("PCIe"), as component devices are PCIe enabled endpoints that connect to the CPU through a PCIe root complex. Such CPU-based PCIe architecture have been considered advantageous for being expandable and straightforward to manage via the CPU.

FIG. 1 illustrates a simplified example of a known CPU-based PCIe architecture 100. Included in architecture 100 is CPU 102, custom application-specific integrated circuits ("ASIC") 104, AI co-processor 106, field programmable gate array ("FPGA") 108, memory controller 110, and memory ("DDR") 112. As shown in FIG. 1, the CPU 102 and subcomponent devices 104, 106, 108, and 110 communicate via system bus 114. Despite all subcomponent devices in FIG. 1 being configured on a bus, the architecture does not support data flow directly between subcomponents. Instead, data flow from a subcomponent to the CPU 102 and are, thereafter, routed to respective subcomponents. Accordingly, the CPU 102 is involved in every data flow or processing operation. Although the architecture is useable to ensure data flow to and from respective subcomponents, the end result is not optimal in terms of efficiency and speed. There are significant latency disadvantages associated with a CPU-based PCIe architecture, such as shown in FIG. 1, due to an inability to provide direct communication between component devices. The requirement of data to go through the CPU 102 results in bottlenecks that limit the ability of the system to respond to events rapidly. Specifically, the cost (in terms of latency and data throughput) of the CPU 102 involved in every single transaction on the bus is resource intensive and highly inefficient to process large amounts of data rapidly.

It is with respect to these and other considerations that the disclosure made herein is presented.

SUMMARY

Implementations of the present disclosure include a computer-implemented asynchronous disaggregated processing system and method. In one or more implementations, an ethernet transceiver is configured to receive data, from at least one computing device over a data communications network and a core processor is configured to process information associated with at least some of the received data. Moreover, a memory is configured to store, via a memory controller, processed information from the core processor, and a field programmable gate array is configured at least as a function of an execution implementation directive to perform steps. The steps include parsing at least some of the received data and preprocessing at least some of the parsed data for use by the core processor. Moreover, the steps include routing, to the core processor, the preprocessed data and receiving, from the core processor, information associated with the preprocessed data. In addition, the steps include routing to the at least one computing device via the ethernet transceiver, a response associated with the information associated with the preprocessed data received from the core processor, and storing, via the memory controller, the information associated with the preprocessed data in the memory.

In one or more implementations, a second core processor is included, wherein the field programmable gate array is further configured to preprocess at least some of the parsed data for use by the second core processor, and further wherein at least one of the steps associated with parsing and preprocessing are in response to the stored information.

In one or more implementations, the at least one second core processor is an artificial intelligence processing unit.

In one or more implementations, the field programmable gate array is further configured to parse, preprocess, route, and store information simultaneously by executing steps in parallel.

In one or more implementations, at least one of receiving and storing the information associated with the preprocessed data occurs via a compute express link.

In one or more implementations, the parsing includes extracting and framing key data.

In one or more implementations, the preprocessing includes filtering extraneous information from the parsed data.

In one or more implementations, the field programmable gate array is further configured by each of a plurality of respective execution implementation directives to parse, preprocess, route, receive, and store respective information substantially simultaneously in parallel during various stages of execution of the respective execution implementation directives.

In one or more implementations, the field programmable gate array is further configured to structure the response associated with the information associated with the preprocessed data received from the core processor prior to routing the response to the at least one computing device.

In one or more implementations, a second core processor, a second memory, a memory switch, an application-specific integrated circuit, and a memory expansion connector can be included, wherein the field programmable gate array is further configured to interface with the at least one of the second core processor, second memory, memory switch, application-specific integrated circuit, and a memory expansion connector, in parallel operations.

Other features of the present disclosure are shown and described herein.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION

By way of overview and introduction, the present disclosure provides systems and methods for, among other things, an improved data processing architecture having interconnected components. In one or more implementations, a field programmable gate array is configured in the data processing architecture to operate as a switch and parsing device and, as such, the communications backbone in place of a CPU-based PCIe implementation. Use of a FPGA as a data communications orchestrator provides significant latency reduction over known PCIe architectures in which component devices route data via a CPU, as described above.

The data processing architecture of the present disclosure provides significant reductions in latency over known arrangements, particularly during large or voluminous data processing tasks, or tasks that require rapid execution. Unlike known systems in which multiple streams of data are processed serially by a CPU, arrangements in accordance with the present disclosure handle operations substantially in parallel, which significantly improves performance. Unlike a CPU-based arrangement, which can be useful for general purpose computing, the present disclosure overcomes shortcomings a CPU-based arrangement, particularly in configurations having a disaggregated architecture, and is more suitable for high-speed data flow.

Figure 2:
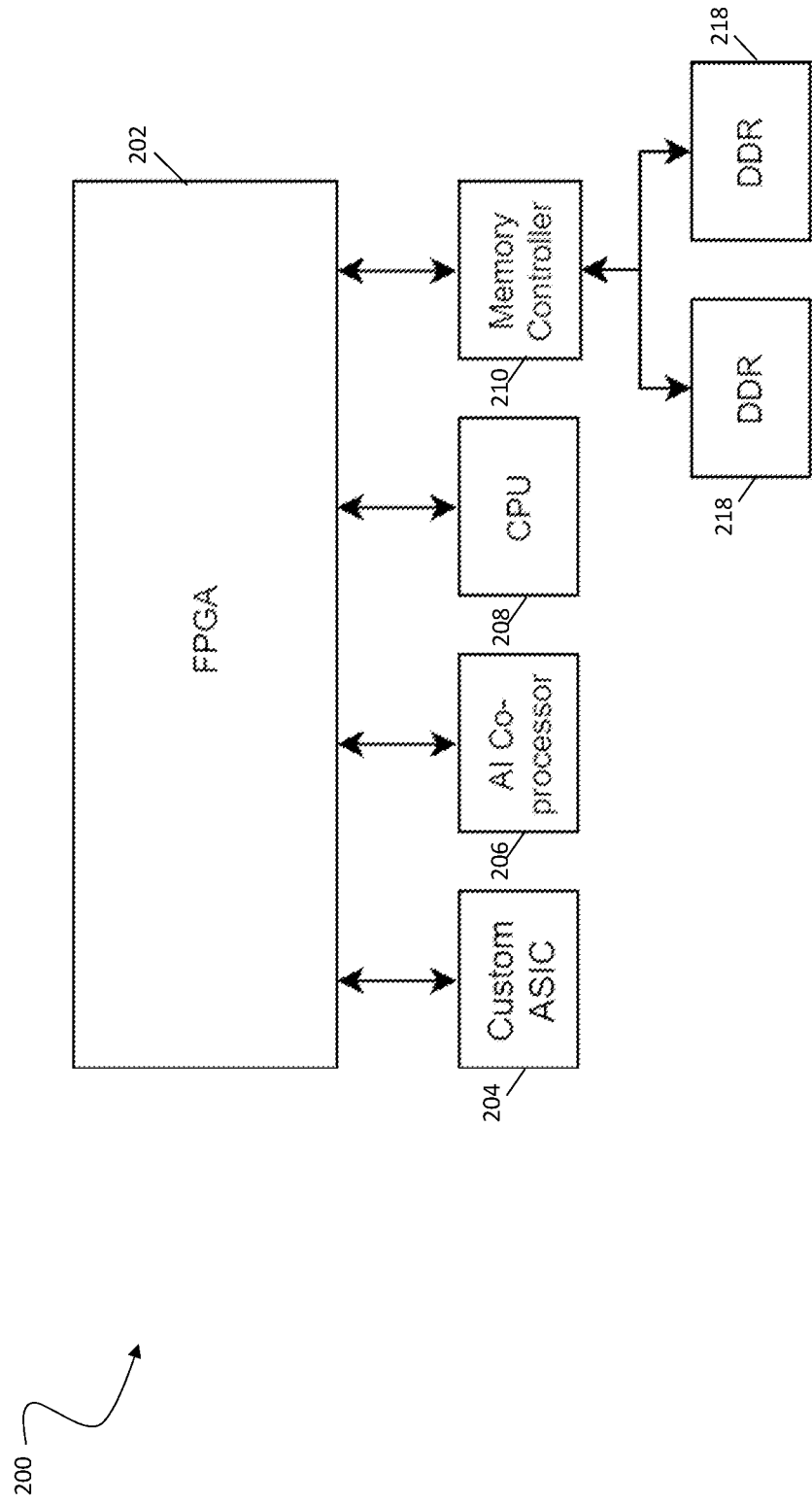
FIG. 2 is a block diagram illustrating an example field programmable gate array-based device configured as a disaggregated system orchestrator, in accordance with an example implementation of the present disclosure.

Referring now to FIG. 2, a simplified orchestration system based on a FPGA 202 is shown. The present disclosure allows for improved interconnection of multiple systems, such as via custom ASIC 204, AI computing modules 206, CPUs 208, memory controller 210 and memory 218 and network interfaces, resulting in a low latency network response device. Moreover, the data processing architecture of the present disclosure is scalable and can expand memory and computing capacity easily while still maintaining low latency connections via high speed input/output ("HSIO") at a network line rate, which allows the system as a whole to sense, act, and respond to events a very high speeds, such as within hundreds of nanoseconds. Processing, such as to parse, structure and pre-process incoming data, can be performed without a need, for example, to go through a high-capacity storage and processing device directly.

Figure 1:
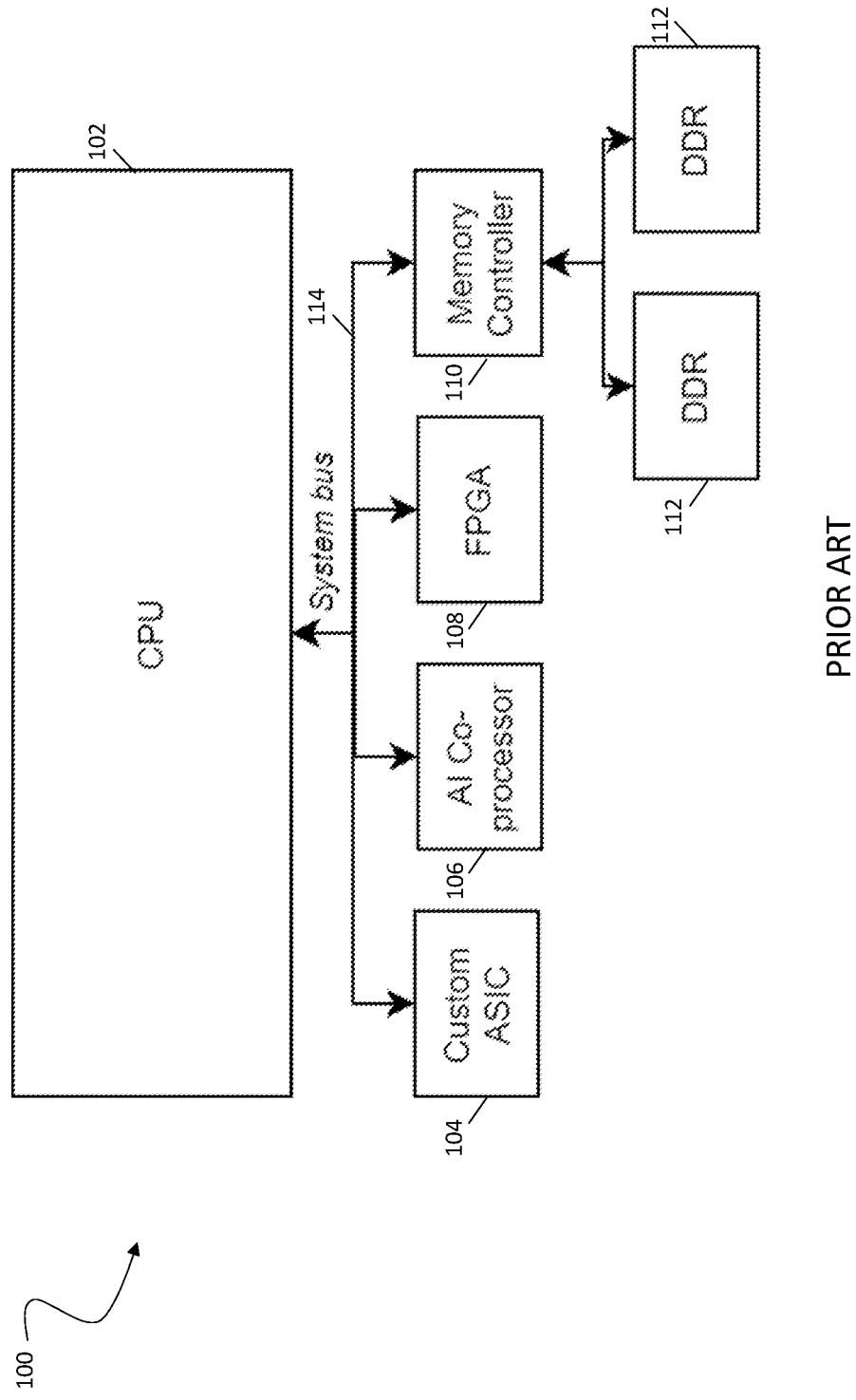
FIG. 1 illustrates a simplified example of a CPU-based PCIe architecture.

The FPGA-based architecture of the present disclosure supports large onboard HSIO, such as multigigabit transceivers, or with a wide bus to interfacing directly with components, such as chips, controllers, switches, or the like. Moreover, the present disclosure supports reconfigurability of the FPGA-based architecture and is easily adaptable for device communications, even via custom protocols or by performing pre-processing without increasing a processing load on a connected device. Such reconfigurability is made possible without incurring significant increases in latency, unlike a CPU-based architecture, such as shown in FIG. 1. Accordingly, the present disclosure includes various aspects, including an overall system architecture which supports respective designs, including execution implementation directives (also referred to as IP blocks) that can configure a FPGA, and that provide low latency interconnectivity between devices, and during data processing and communications. For example, the FPGA can use one or more execution implementation directives to filter and route information specifically to an AI processor, while preprocessing and providing other information to a CPU.

Continuing with reference to FIG. 2, a simplified implementation of the present disclosure system architecture is illustrated. At the core of the architecture is FPGA 202 that can be configured to receive data from external devices, including custom ASIC 204, AI coprocessor 206, CPU 208, and memory controller 210. The FPGA can be configured via execution implementation directives to structure or pre-process data, such as to transpose data into a different form for compliance with to respective component device. It is to be appreciated that types of component devices that connect to the FPGA can depend on a respective implementation, although it is envisioned that many implementations will include at least one CPU 208, memory 210, and some form of co-processor (e.g., AI co-processor 206).

Figure 3:
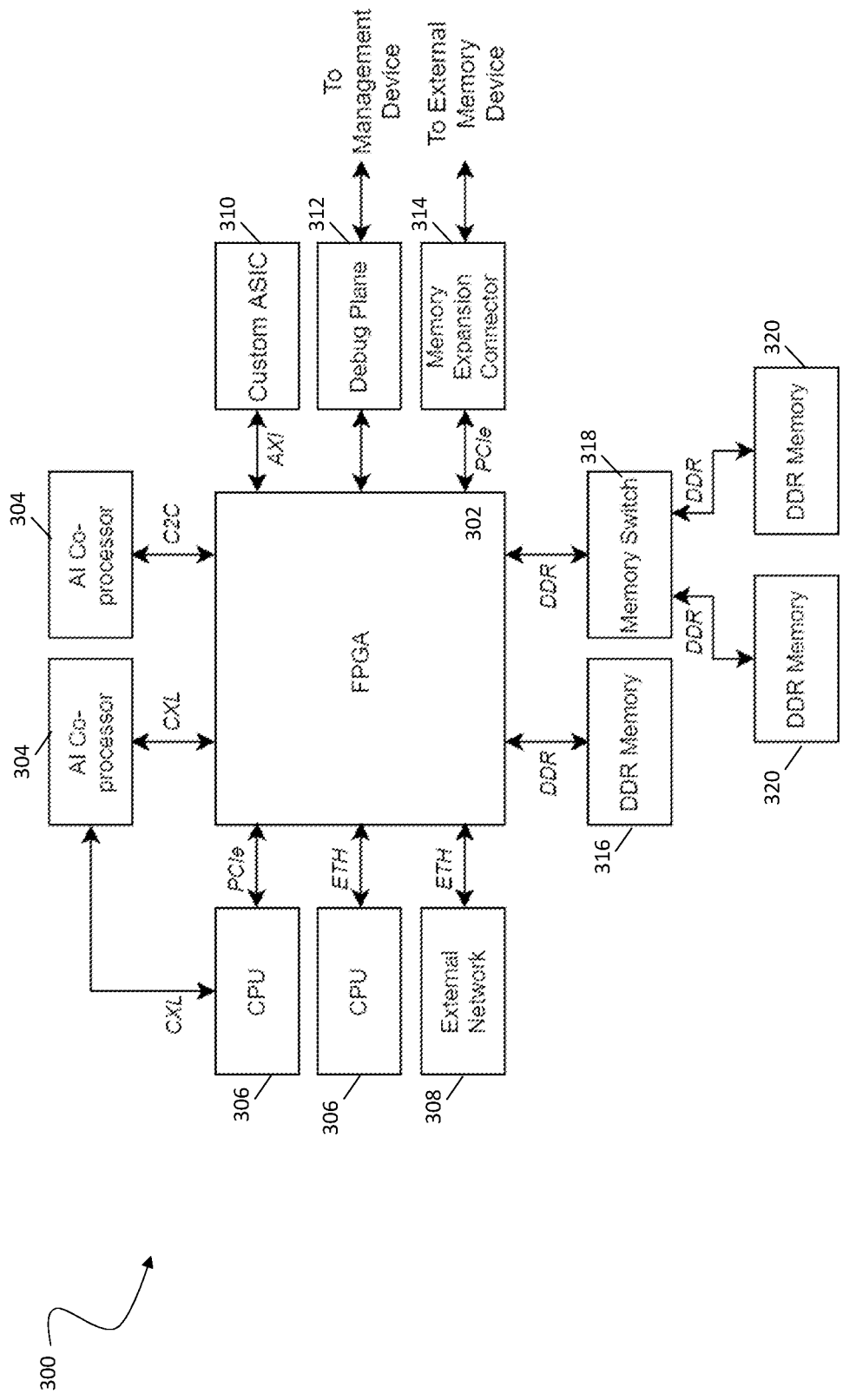
FIG. 3 is a block diagram illustrating a more complex implementation than that shown in FIG. 2, which support parallel processing and includes a plurality of CPUs, along with structured memory, AI co-processors, and ASIC.

FIG. 3 illustrates a more complex implementation than that shown in FIG. 2, and supports parallel processing via a plurality of CPUs 306, structured memory 316, AI co-processors 304, and ASIC 310. It is recognized that certain implementations of the present disclosure can include devices that are or are intended to be mounted on a shared printed circuit board ("PCB"), which avoids a need for external cabling and, thus, reduces latency. In one or more other implementations, it may be impractical or impossible to mount certain devices on the same PCB, such as in cases where a large amount of memory is required. The present disclosure supports external interfaces and connections to external devices to facilitate expansion, without sacrificing significant latency. For example, and as shown in FIG. 3, external network interface 308 is connectable, such as via an Ethernet connection. Furthermore, a debug plane 312 can connect to one or more management devices, and a memory expansion controller 314 supports connectivity to one or more external memory devices. Still further, memory switch 318 supports connectivity to external DDR memory 320.

The field programmable gate array-based architecture in accordance with the present disclosure can be configured to operate as a multi-protocol, data and context aware switch, as opposed to a key processing unit within a system, as shown and described with reference to FIG. 1. Accordingly, the FPGA can be construed as a central orchestrating unit ("COU"), in which component devices, such as CPU and AI processors, perform processing operations and the COU provides a flexible and fast way to connect the component devices, as well as to preprocess data provided thereto and/or therefrom. The present disclosure is advantageous by lightly processing, e.g., parsing, data into the COU, which can be fed directly to each component device in a respectively appropriate format. Such pre-processing can range from being simple, such as filtering and stripping out metadata, to being more complex (e.g., data compression). The FPGA-based architecture of the present disclosure frees component devices, such as core processors, from having to perform intensive data handling and enables components to focus on data processing tasks. The FPGA's inherent high pin count and multiple onboard transceivers enable multiple streams to be handled in parallel, which is not possible in a CPU-based architecture, which typically has less pins and only PCIe connectivity.

Figure 4:
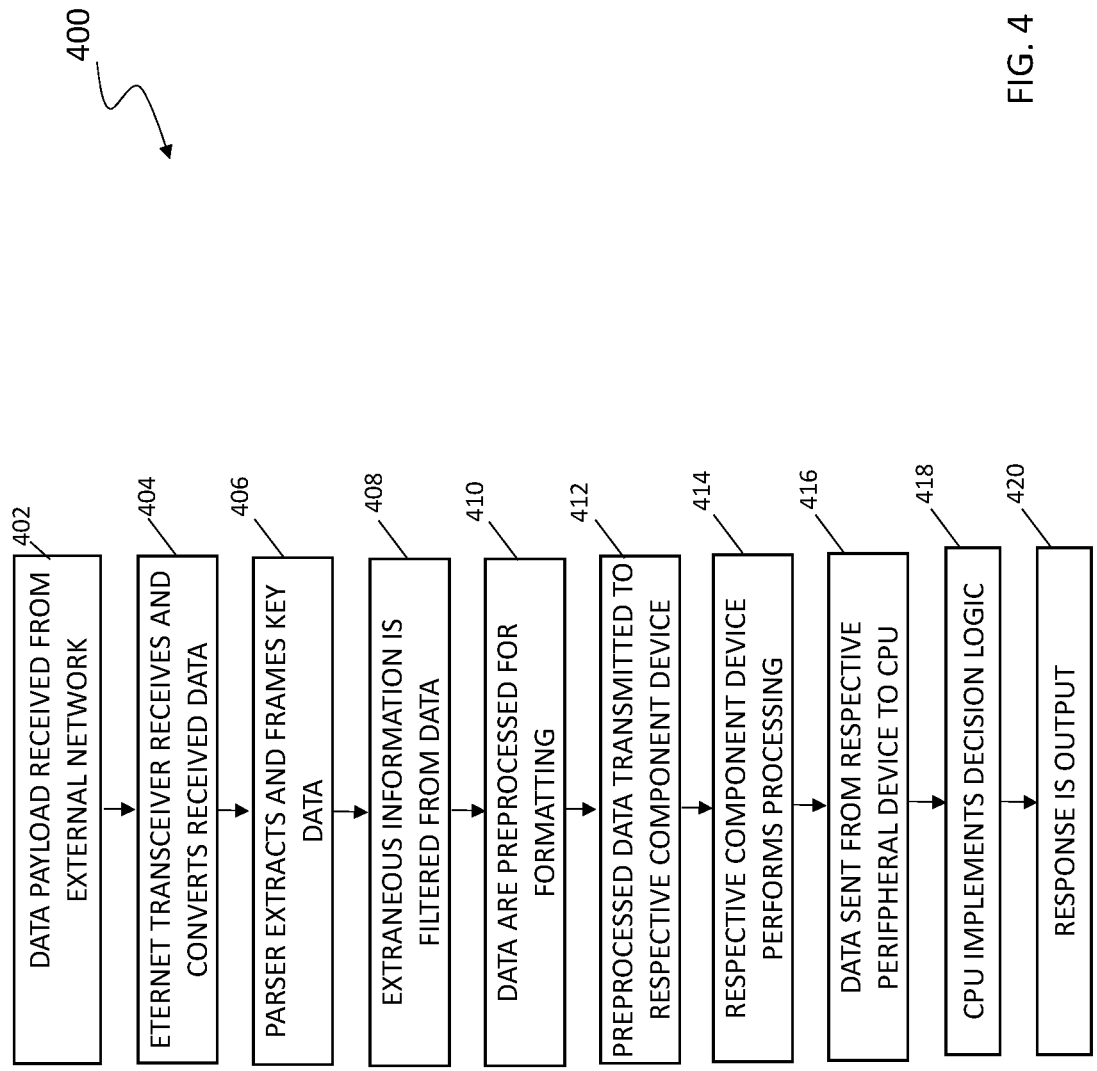
FIG. 4 is a flow chart illustrating example steps that are associated with data handling, for example, in accordance with an example implementation of the present disclosure.

FIG. 4 is a flow chart illustrating example steps 400 that are associated with data handling, for example, in accordance with a financial trading application, in an example implementation of the present disclosure. It should be appreciated that several of the logical operations described herein are implemented (1) as a sequence of computer implemented acts or program modules running on a communication device and/or (2) as interconnected machine logic circuits or circuit modules within a communication device. The implementation is a matter of choice dependent on the requirements of the device (e.g., size, energy, consumption, performance, etc.). Accordingly, the logical operations described herein are referred to variously as operations, structural devices, acts, or modules. Several of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Figure 5:
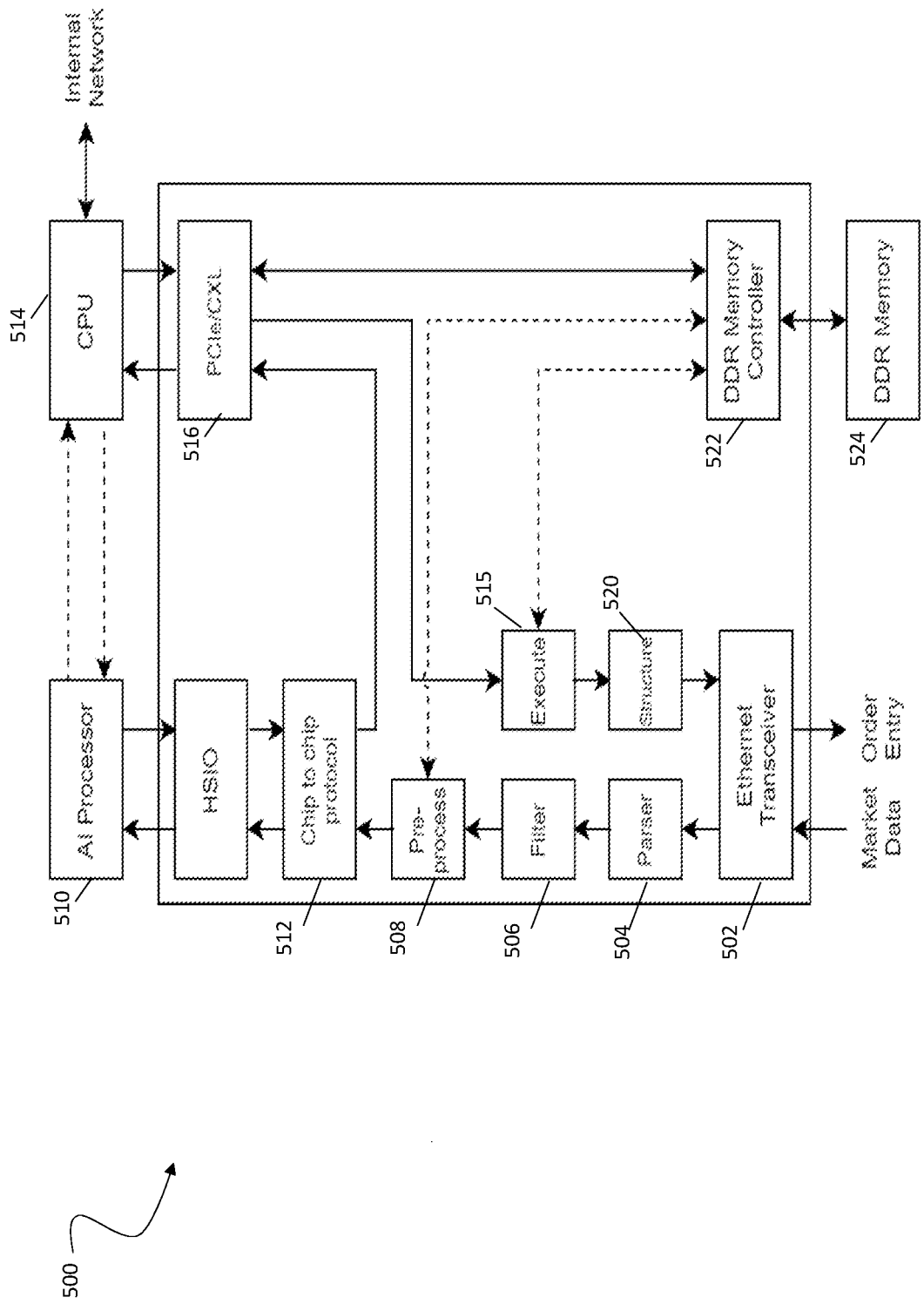
FIG. 5 is a block diagram illustrating features and steps associated with the data handling steps shown in connection with the implementation in FIG. 4.
Figure 6:
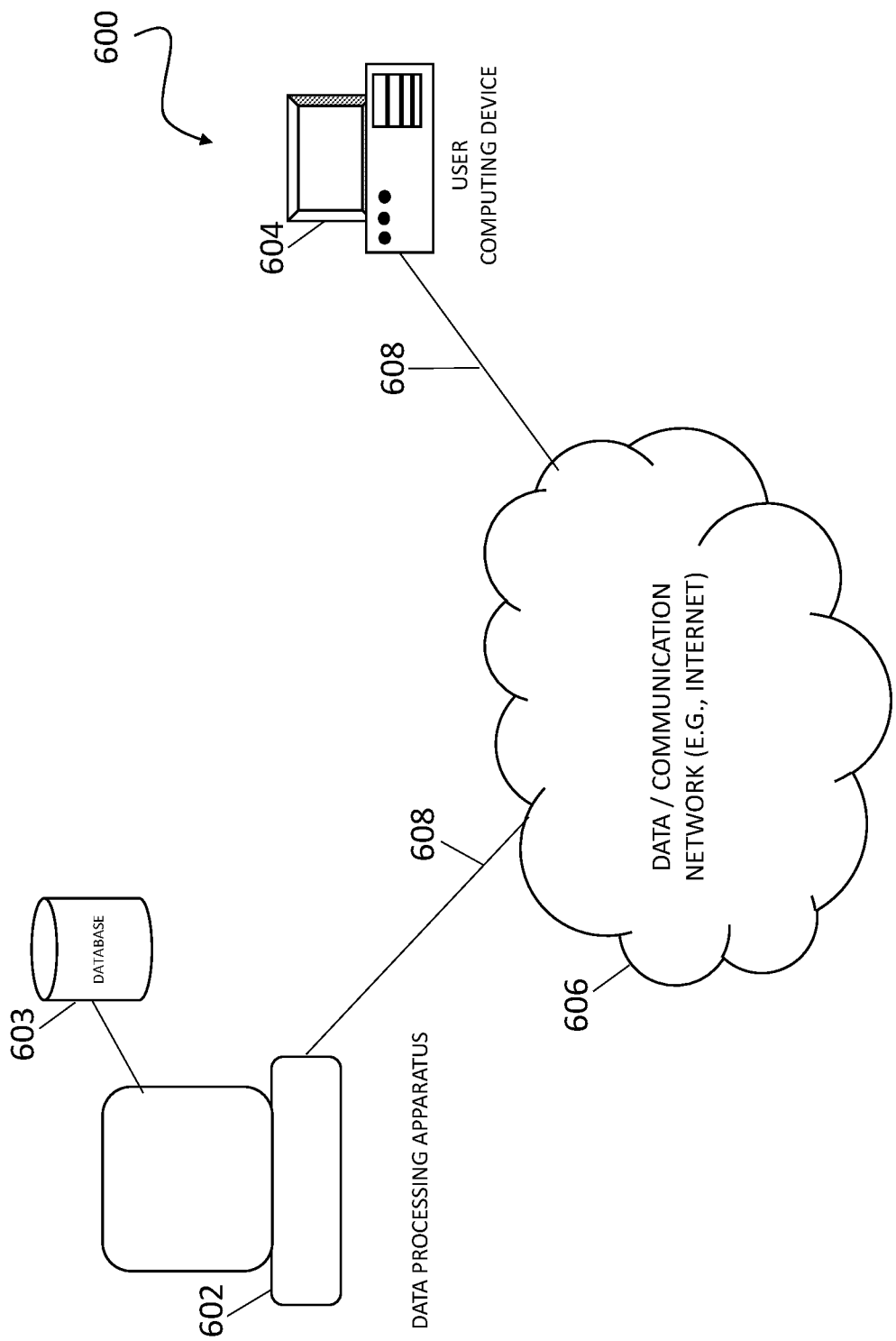
FIG. 6 is a diagram showing an example hardware arrangement that can be configured for providing the systems and methods disclosed herein.
Figure 7:
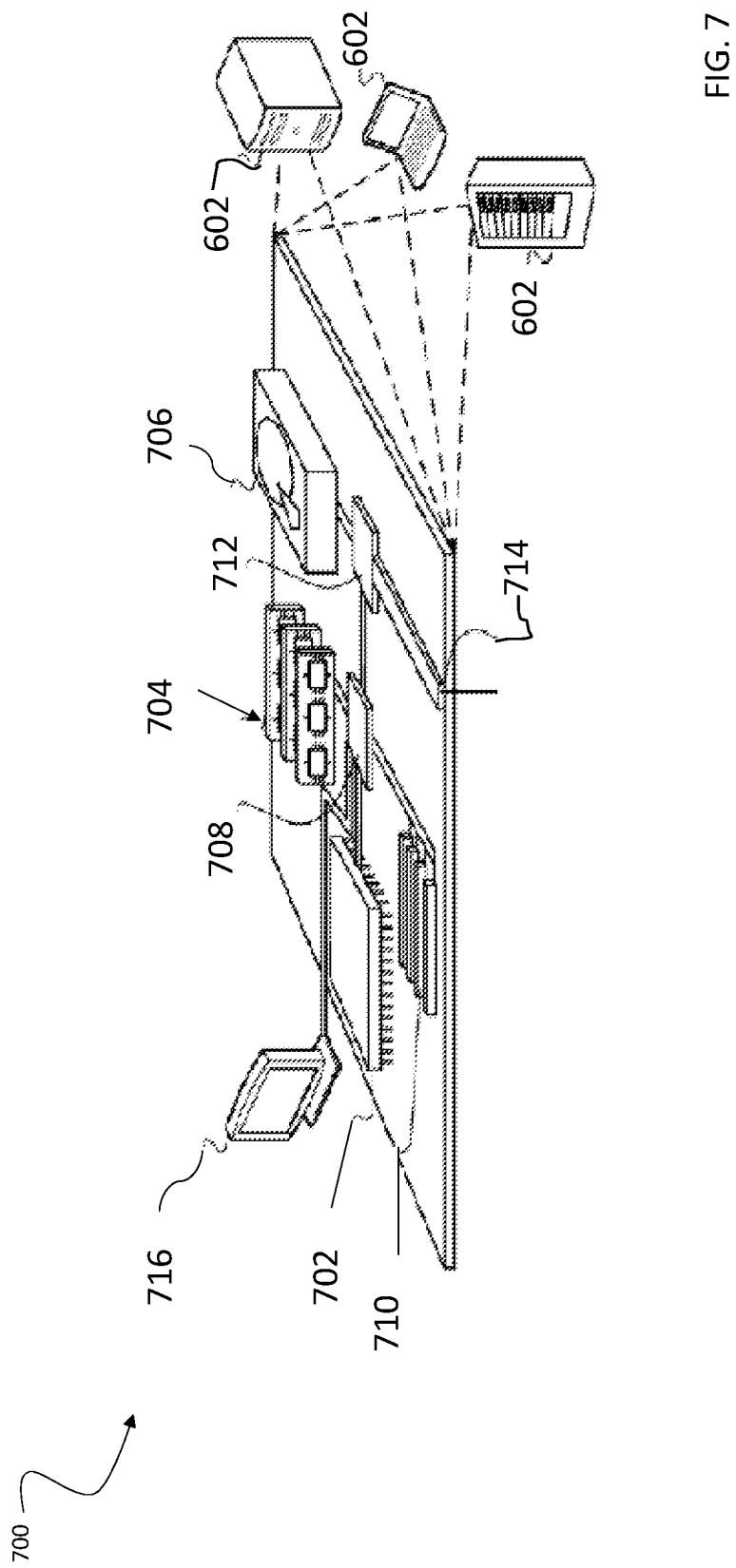
FIG. 7 shows aspects of an example information processor and/or user computing device.

FIG. 5 is a block diagram illustrating an implementation of the present disclosure system architecture and performing a process including steps shown in FIG. 4. In the example application associated with the steps shown in FIG. 4 and FIG. 5, a large amount of data processing is required, which can involve various processing units, such as central processing unit(s), graphics processing unit(s), and accelerator hardware. The FGPA-based architecture of the present disclosure achieves low latency in a way that would be difficult if not impossible via a traditional CPU-centric computer architecture.

Continuing with reference to FIGS. 4 and 5, at step 402 a data payload, such as including market data, enters the system from an external network such as an exchange. At step 404, the data are received by an ethernet transceiver 502 and converted to raw data, such as into an XGMII frame. Thereafter, the data pass through a parser 504, which extracts and frames the key data (step 406). For example, the key information can include a stock symbol, price and order type. After the data are parsed, the data can then be filtered via filter 506, such as to remove any extraneous information that is not important (step 408).

Continuing with reference to FIGS. 4 and 5, after filtering, the data are preprocessed, for example, by a pre-processor 508 to convert data into a respective format for a given component device (step 410). For example, data may be converted for reception by an AI processor 510 having specific data structure preferences, such as data being compressed, redundant information removed, or other suitable preprocessing. In a traditional computer architecture, such task would be performed in a CPU that incurs a latency cost. In accordance with the present disclosure, the FPGA can offload one or more of the tasks performed in steps 402-410, thereby removing the CPU as a potential bottleneck.

Continuing with reference to FIGS. 4 and 5, after pre-processing in step 410, the FPGA sends the data to a respective component device (e.g., AI processor 510) (step 412). On a physical level, the transmission can take the form of a compute express link ("CXL") data transmission, or even a custom chip-to-chip (C2C) protocol 512 that can be specific and optimized to comply with AI processor 510 preference. The AI processor 510 can then process the received data, for example, to output high quality information (step 414). For example, the AI processor may be running a neural network to identify patterns in the incoming data, and output information on the trends of the incoming data. The output from the AI processor 510 can be fed in the CPU 514 (step 416). For example, the output from the AI processor 510 can be transmitted directly or indirectly through the FPGA, and the CPU 514 can implement various decision logic, such as whether a trade should be made in view of a specific pattern of data. Up until this point in the process shown and described in FIGS. 4 and 5, no tasks have been required of CPU 514, and the CPU 514 is able to focus on the specialized role of implementing trading logic. In other words, the CPU 514 need only perform the task of making a decision and is freed from otherwise menial tasks, such as data handling and movement, which can otherwise result in latency (step 418). Thereafter, the CPU 514 responds back to the FPGA, which travels through an execution block which structures the data for transmission back into the market as an order entry response (step 420). The response can be executed and structured (518 and 520) prior to being routed via the Ethernet transceiver 502 for further use. In one or more implementations, processed data from AI processor 510 and/or CPU the parser 504 can be provided via an ethernet transceiver 502 to an outside application and/or DDR memory controller 522 to DDR memory 524.

Accordingly, and as shown and described herein, the present disclosure overcomes shortcomings associated with applications that require highspeed processing, including as a function of a FPGA acting as a low latency disaggregated system orchestrator in a disaggregated arrangement of component devices. The FPGA of the present disclosure inherently has an adaptable fabric including significant IO, and enables connectivity to many component devices, such as to sensors, networks, satellites, or virtually any other connectible component device. The present disclosure uses inputs to receive, parse, structure, and process the information received therefrom in a new architecture efficiently and rapidly. For example, using the teachings herein, AI processors and other components can receive information via a FGPA rapidly, such as within 10 or 20 nanoseconds. The present disclosure can further provide a model, such as a deterministic model, that provides feedback rapidly and sent via HSIO to a component device, such as via a network controller and to an exchange. Still further, the present disclosure supports inferences in low latency applications, including in a scalable architecture in which one or more FPGAs can be a central hub. As shown and described in connection with FIG. 5, high speed connectivity can be provided via multiple CPUs, ethernet, PCIe/CXL 516, chip-to-chip, or the like, with significantly reduced latency than in known systems.

The highly flexible architecture shown and designed herein is useful in many kinds of applications that require rapid processing and communications, such as but not limited to robotics, detecting and responding to chemical reactions, sensed events, or in virtually any other high-speed application. Data can be preprocessed substantially in real time and combined with information in memory, including in bidirectional data storage, all being orchestrated by a FPGA that handles operations in parallel. Because a connection is provided to a CPU, the CPU can provide processed information, such as a lookup table, including via PCIe/CXL 516 which can be referenced during parallel preprocessing operations.

Thus, a FPGA is configured to operate as a central orchestrating unit, and the architecture of the present invention can significantly increase compute density (e.g., processing operations) in a reduced time envelope (e.g., 200 nanoseconds instead of 200 milliseconds). This is accomplished, at least in part, by reducing or even eliminating serialization of known systems, and by providing an asynchronous, highly parallelized system comprising on/off operations in practically constantly. Even as information is received via ethernet transceiver 502, for example, other operations to store data from CPU 514 in DDR memory 520 can be occurring, processing operations drawing on data in DDR memory 520 can be executing, and information can be in process of being transferred to AI processor 510, all substantially simultaneously in parallel. Accordingly, while many of the descriptions set forth herein appear divided as respective ones of serial examples, it is to be appreciated that asynchronous parallel operations are occurring as the FPGA acts as a central processing orchestrator in a disaggregated computing system. The architecture of the present disclosure effectively reduces latency and is deterministic and solves problems associated with complexities in parallelism handled by field programmable gate arrays. Errors, including programming errors, that may otherwise be introduced, such as during verification of completion and correctness of executed steps relating to steps, execution paths, and completion can be eliminated in multi-stage operations, including independently and in integrated ways.

Accordingly, the present disclosure provides a FPGA-based orchestration system that allows for interconnection of multiple systems, such as AI computing modules, CPUs, memory and network interfaces, in a low latency network response device. The features described herein are scalable to expand memory/compute capacity easily while maintaining a low latency connection to multiple HSIO at network line rate, allowing the system as a whole to respond to sense, act and respond to events within 100's of nanoseconds, including by giving the system the ability to parse, structure and pre-process incoming data, without a need to directly go through one or more high-capacity storage devices.

Referring to FIG. 8, a diagram is provided that shows an example hardware arrangement that is configured for providing the systems and methods disclosed herein and designated generally as system 800. System 800 can include one or more information processors 802 that are at least communicatively coupled to one or more user computing devices 804 across communication network 806. Information processors 802 and user computing devices 804 can include, for example, mobile computing devices such as tablet computing devices, smartphones, personal digital assistants or the like, as well as laptop computers and/or desktop computers, server computers and mainframe computers. Further, one computing device may be configured as an information processor 802 and a user computing device 804, depending upon operations being executed at a particular time.

With continued reference to FIG. 8, information processor 802 can be configured to access one or more databases 803 for the present disclosure, including source code repositories and other information. However, it is contemplated that information processor 802 can access any required databases via communication network 806 or any other communication network to which information processor 802 has access. Information processor 802 can communicate with devices comprising databases using any known communication method, including a direct serial, parallel, universal serial bus ("USB") interface, or via a local or wide area network.

User computing devices 804 can communicate with information processors 802 using data connections 808, which are respectively coupled to communication network 806. Communication network 806 can be any data communication network. Data connections 808 can be any known arrangement for accessing communication network 806, such as the public internet, private Internet (e.g., VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 804 preferably have the ability to send and receive data across communication network 806, and are equipped with web browsers, software disclosures, or other means, to provide received data on display devices incorporated therewith. By way of example, user computing device 804 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 806, and that wireless communication can be provided between wireless devices and information processors 802.

System 800 preferably includes software that provides functionality described in greater detail herein, and preferably resides on one or more information processors 802 and/or user computing devices 804. One of the functions performed by information processor 802 is that of operating as a web server and/or a web site host. Information processors 802 typically communicate with communication network 806 across a permanent (i.e. un-switched) data connection 808. Permanent connectivity ensures that access to information processors 802 is always available.

FIG. 9 shows an example information processor 802 and/or user computing device 804 that can be used to implement the techniques described herein. The information processor 802 and/or user computing device 804 is intended to represent various forms of digital computers, such as laptops, desktops, workstations, personal digital assistants, servers, blade servers, mainframes, and other appropriate computers. The components shown in FIG. 9, including connections and relationships, and their functions, are meant to be exemplary only, and are not meant to limit implementations of the inventions described and/or claimed in this document.

As shown in FIG. 9, the information processor 802 and/or user computing device 804 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the highspeed expansion ports 910, and the low-speed interface 912, are interconnected using various busses, and can be mounted on a common motherboard or in other manners as appropriate. The processor 902 can process instructions for execution within the information processor 802 and/or user computing device 804, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the information processor 802 and/or user computing device 804. In some implementations, the memory 904 is a volatile memory unit or units. In some implementations, the memory 904 is a non-volatile memory unit or units. The memory 904 can also be another form of computer-readable medium, such as a magnetic or optical disk.

The storage device 906 is capable of providing mass storage for the information processor 802 and/or user computing device 804. In some implementations, the storage device 906 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 can be configured to manage bandwidth-intensive operations, while the low-speed interface 912 can be configured to manage lower bandwidth-intensive operations. Of course, one of ordinary skill in the art will recognize that such allocation of functions is exemplary only. In some implementations, the high-speed interface 908 is coupled to the memory 904, the display 916 (e.g., through a graphics processor or accelerator), and to the high-speed expansion ports 910, which can accept various expansion cards (not shown). In an implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter. Accordingly, the automated methods described herein can be implemented by in various forms, including an electronic circuit configured (e.g., by code, such as programmed, by custom logic, as in configurable logic gates, or the like) to carry out steps of a method. Moreover, steps can be performed on or using programmed logic, such as custom or preprogrammed control logic devices, circuits, or processors. Examples include a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause these methods to be carried out.

Accordingly, as shown and described herein, respective configurations in a replicator/switch device 102 are provided that include full traffic mirroring in an ethernet network with significant reduction in latency. In one or more implementations, a combined approach to achieving L1 and L2 switching and respective bypassing is supported, which can include fast path replication for lowest latency monitoring. Further, latency steering or gating can be provided as a function of respective physical distances of components set forth in a replicator/switch device 102. For example, by positioning replicating components away from the hot path, additional heat and corresponding latency can be avoided. Still further, implementations are supported herein in which a sort of free replicator can be realized as a function of otherwise unused negative signal of a circuit element, applied as an input to a 1:2 mux 602.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this disclosure, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed:

1. An asynchronous computer-implemented disaggregated processing system, comprising:
an ethernet transceiver configured to receive data from at least one computing device over a data communications network;
a first end node configured to process information associated with at least some of the received data;
a memory configured to store, via a second end node, processed information from the first end node; and
a field programmable gate array, configured to dynamically orchestrate a connection between the first end node and the second end node at least as a function of an execution implementation directive, wherein the field programmable gate array is configured to dynamically orchestrate the connection between the first end node and the second end node by:
  parsing, by the field programmable gate array, at least some of the received data;
  preprocessing, by the field programmable gate array, at least some of the parsed data for use by the first node;
  routing, by the field programmable gate array to the first node, the preprocessed data;
  receiving, by the field programmable gate array from the first node, information associated with the preprocessed data; and
  routing, by the field programmable gate array to the at least one computing device via the ethernet transceiver, a response associated with the information received from the first node.

2. The system of claim 1, further comprising a third end node, wherein the field programmable gate array is further configured to:
  preprocess at least some of the parsed data for use by the third end node, wherein at least one of the steps associated with parsing and preprocessing are in response to the information associated with the preprocessed data.

3. The system of claim 2, wherein the third end node is an artificial intelligence processing unit.

4. The system of claim 3, wherein field programmable gate array is further configured to:
  parse, preprocess, route, and store information simultaneously by executing steps in parallel.

5. The system of claim 1, wherein field programmable gate array is further configured to store, via the second end node, the information associated with the preprocessed data in the memory, and further wherein at least one of receiving and storing the information associated with the preprocessed data occurs via a compute express link.

6. The system of claim 1, wherein the parsing includes extracting and framing key data.

7. The system of claim 1, wherein the preprocessing includes filtering extraneous information from the parsed data.

8. The system of claim 1, wherein the field programmable gate array is further configured by each of a plurality of respective execution implementation directives to:
  parse, preprocess, route, receive, and store respective information simultaneously in parallel during various stages of execution of the respective execution implementation directives.

9. The system of claim 1, wherein the field programmable gate array is further configured to structure the response associated with the information associated with the preprocessed data received from the first end node prior to routing the response to the at least one computing device.

10. The system of claim 1, further comprising at least one of:
  a third end node;
  a second memory;
  a memory switch;
  an application-specific integrated circuit; and
  a memory expansion connector,
  wherein the field programmable gate array is further configured to interface with the at least one of the third end node, second memory, memory switch, application-specific integrated circuit, and a memory expansion connector, in parallel operations.

11. The system of claim 1, wherein the first end node is a domain specific application-specific integrated circuit ("ASIC").

12. The system of claim 1, wherein first end node, the field programmable gate array, and the second end node are mounted on a shared printed circuit board.

13. An asynchronous computer-implemented disaggregated processing method, comprising:
  dynamically orchestrating, by a field programmable gate array that is configured at least as a function of an execution implementation directive, a connection between a first end node and a second end node, by:
    parsing, by the field programmable gate array, at least some of data from at least one computing device and received by an ethernet transceiver over a data communications network;
    preprocessing, by the field programmable gate array, at least some of the parsed data for use by a first end node that is configured to process information associated with at least some of the received data;
    routing, by the field programmable gate array to the first end node, the preprocessed data;
    receiving, by the field programmable gate array from the first end node, information associated with the preprocessed data; and
    routing, by the field programmable gate array to the at least one computing device via the ethernet transceiver, a response associated with the information received from the first end node.

14. The method of claim 13, further comprising
  preprocess at least some of the parsed data for use by a third end node, wherein at least one of the steps associated with parsing and preprocessing are in response to the information associated with the preprocessed data.

15. The method of claim 14, wherein the third end node is an artificial intelligence processing unit.

16. The method of claim 15, further comprising:
  parsing, preprocessing, routing, and storing by the field programmable gate array, the information associated with the preprocessed data simultaneously by executing steps in parallel.

17. The method of claim 13, further comprising:
  storing, by the field programmable gate array via the second end node, the information associated with the preprocessed data in the memory, wherein at least one of receiving and storing the information associated with the preprocessed data occurs via a compute express link.

18. The method of claim 13, wherein the parsing includes extracting and framing key data.

19. The method of claim 13, wherein the preprocessing includes filtering extraneous information from the parsed data.

20. The method of claim 13, further comprising:
  parsing, preprocessing, routing, receiving, and storing, by the field programmable gate array, respective information simultaneously in parallel during various stages of execution of a plurality of respective execution implementation directives.

21. The method of claim 13, further comprising:
  structuring, by the field programmable gate array, the response associated with the information associated with the preprocessed data received from the first end node prior to routing the response to the at least one computing device.

22. The method of claim 13, further comprising:
  interfacing, by the field programmable gate array with at least one of a third end node, a second memory, a memory switch, an application-specific integrated circuit, and a memory expansion connector, in parallel operations.

23. The method of claim 13, wherein the first end node is a domain specific application-specific integrated circuit ("ASIC").

24. The method of claim 13, further comprising mounting the first end node, the field programmable gate array, and the second end node on a shared printed circuit board.

* * * * *